US008269603B2

(12) United States Patent
Aoki et al.

(10) Patent No.: US 8,269,603 B2
(45) Date of Patent: Sep. 18, 2012

(54) PASSAGE AUTHORIZATION SYSTEM

(75) Inventors: Takahiro Aoki, Kawasaki (JP); Soichi Hama, Kawasaki (JP); Mitsuaki Fukuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 195 days.

(21) Appl. No.: 12/722,021

(22) Filed: Mar. 11, 2010

(65) Prior Publication Data

US 2010/0245041 A1 Sep. 30, 2010

(30) Foreign Application Priority Data

Mar. 25, 2009 (JP) .................................. 2009-74347

(51) Int. Cl.
*G05B 19/00* (2006.01)

(52) U.S. Cl. ...................................... 340/5.82; 340/5.83

(58) Field of Classification Search ................... 340/5.2, 340/5.8–5.83; 235/38, 382, 382.5, 384; 382/4, 382/127, 115, 210, 197, 124, 125; 367/125, 367/191; 356/71; 181/126; 600/437, 587; 73/579; 88/24; 396/374; 713/202
See application file for complete search history.

(56) References Cited

U.S. PATENT DOCUMENTS 5,793,881 A * 8/1998 Stiver et al. .................. 382/115
5,845,692 A * 12/1998 Kellem et al. ................ 160/118
6,119,096 A * 9/2000 Mann et al. ...................... 705/5
6,745,520 B2 * 6/2004 Puskaric et al. ................. 52/64
6,819,219 B1 * 11/2004 Bolle et al. .................. 340/5.52
6,867,683 B2 * 3/2005 Calvesio et al. ............ 340/5.52
7,203,344 B2 * 4/2007 McClurg et al. .............. 382/115
7,331,522 B2 * 2/2008 Sandoval et al. ............. 235/384
7,392,939 B2 * 7/2008 Hauke et al. .................. 235/380
7,773,780 B2 * 8/2010 Schneider et al. ............ 382/116
7,885,433 B2 * 2/2011 Yano et al. .................... 382/115
2003/0169640 A1 9/2003 Koenig
2004/0133804 A1 * 7/2004 Smith et al. ................... 713/201
2005/0092831 A1 5/2005 Sandoval et al.
2010/0237984 A1 * 9/2010 Zenaty .......................... 340/5.2

FOREIGN PATENT DOCUMENTS

DE 101 63 123 A1 7/2003
DE 10 2004 048 403 A1 4/2006
EP 0 345 980 12/1989
EP 0 910 050 A1 4/1999
EP 1 347 420 A2 9/2003
GB 1 502 586 3/1978

(Continued)

OTHER PUBLICATIONS

Communication issued by the European Patent Office on Jul. 20, 2011 in related European patent application No. 10156878.0.

(Continued)

*Primary Examiner* — Daniel Wu
*Assistant Examiner* — Mancil Littlejohn
(74) *Attorney, Agent, or Firm* — Staas & Halsey LLP

(57) ABSTRACT

A passage authorization system includes a plurality of gate management apparatuses that are individually provided with authentication sensors for acquiring biometric data from a presented hand and form paths, an authentication unit configured to output a result of authentication comparison performed with the biometric data acquired by each of the authentication sensors and a hand determination result of determining whether the biometric data is data of a left hand or a right hand, and a control unit configured to control opening/closing of a gate corresponding to the hand determination result on the basis of the result of authentication comparison.

8 Claims, 16 Drawing Sheets

FOREIGN PATENT DOCUMENTS

| | | | |
|---|---|---|---|
| JP | 2006-119851 | | 5/2006 |
| JP | 2006-277428 | | 10/2006 |
| JP | 2007-77708 | | 3/2007 |
| WO | 2006/048311 | A2 | 5/2006 |

OTHER PUBLICATIONS

Communication issued by the European Patent Office on May 11, 2010 in related European patent application No. 10156878.0.

* cited by examiner

FIG.6

| USER ID | L/R FLAG | REGISTERED TEMPLATE |
|---|---|---|
| 0000001 | L | XXXXXX |
| | R | XXXXXX |
| 0000002 | L | XXXXXX |
| | R | XXXXXX |
| 0000003 | L | XXXXXX |
| | R | XXXXXX |
| | | |

FIG.7A

GATE CONTROL TABLE (GATE MANAGEMENT APPARATUS #1)

| TEMPLATE L/R FLAG | GATE TO BE OPENED |
|---|---|
| L | GATE #1 |
| R | GATE #1 |

FIG.7B

GATE CONTROL TABLE (GATE MANAGEMENT APPARATUS #2)

| L/R FLAG OF TEMPLATE | GATE TO BE OPENED |
|---|---|
| L | GATE #2 |
| R | GATE #1 |

FIG.7C

GATE CONTROL TABLE (GATE MANAGEMENT APPARATUS #3)

| TEMPLATE L/R FLAG | GATE TO BE OPENED |
|---|---|
| L | GATE #3 |
| R | GATE #2 |

FIG.7D

GATE CONTROL TABLE (GATE MANAGEMENT APPARATUS #4)

| TEMPLATE L/R FLAG | GATE TO BE OPENED |
|---|---|
| L | GATE #3 |
| R | GATE #3 |

FIG.9A

GATE CONTROL TABLE (GATE MANAGEMENT APPARATUS #1)

| TEMPLATE L/R FLAG | COMPARISON ANGLE | GATE TO BE OPENED |
|---|---|---|
| L | WHOLE RANGE | GATE #1 |
| R | WHOLE RANGE | GATE #1 |

FIG.9B

GATE CONTROL TABLE (GATE MANAGEMENT APPARATUS #2)

| TEMPLATE L/R FLAG | COMPARISON ANGLE | GATE TO BE OPENED |
|---|---|---|
| L | $-90° \leqq \Delta\theta \leqq +90°$ | GATE #2 |
| | OTHER THAN THE ABOVE | GATE #1 |
| R | $-90° \leqq \Delta\theta \leqq +90°$ | GATE #1 |
| | OTHER THAN THE ABOVE | GATE #2 |

FIG.9C

GATE CONTROL TABLE (GATE MANAGEMENT APPARATUS #3)

| TEMPLATE L/R FLAG | COMPARISON ANGLE | GATE TO BE OPENED |
|---|---|---|
| L | $-90° \leqq \Delta\theta \leqq +90°$ | GATE #3 |
| | OTHER THAN THE ABOVE | GATE #2 |
| R | $-90° \leqq \Delta\theta \leqq +90°$ | GATE #2 |
| | OTHER THAN THE ABOVE | GATE #3 |

FIG.9D

GATE CONTROL TABLE (GATE MANAGEMENT APPARATUS #4)

| TEMPLATE L/R FLAG | COMPARISON ANGLE | GATE TO BE OPENED |
|---|---|---|
| L | WHOLE RANGE | GATE #3 |
| R | WHOLE RANGE | GATE #3 |

FIG.14A

GATE CONTROL TABLE (GATE MANAGEMENT APPARATUS #1)

| TEMPLATE L/R FLAG | GATE TO BE OPENED |
|---|---|
| L | GATE #1 |

FIG.14B

AUTHENTICATION CONDITION LIST

| |
|---|
| AUTHENTICATION TARGET TEMPLATE L/R FLAG : L |

FIG.15A

GATE CONTROL TABLE (GATE MANAGEMENT APPARATUS #2)

| TEMPLATE L/R FLAG | GATE TO BE OPENED | AUTHENTICATION PRIORITY |
|---|---|---|
| L | GATE #2 | 1 |
| R | GATE #1 | 0 |

FIG.15B

AUTHENTICATION CONDITION LIST

| |
|---|
| AUTHENTICATION TARGET TEMPLATE L/R FLAG : L AUTHENTICATION PRIORITY : 1 |
| AUTHENTICATION TARGET TEMPLATE L/R FLAG : R AUTHENTICATION PRIORITY : 0 |

FIG.16A

GATE CONTROL TABLE (GATE MANAGEMENT APPARATUS #2)

| TEMPLATE L/R FLAG | $\Delta\theta$ | GATE TO BE OPENED | TEMPORARY AUTHENTICATION PRIORITY |
|---|---|---|---|
| L | $-90° \leqq \Delta\theta \leqq +90°$ | #2 | 2 |
| | OTHER THAN THE ABOVE | #1 | 0 |
| R | $-90° \leqq \Delta\theta \leqq +90°$ | #1 | 3 |
| | OTHER THAN THE ABOVE | #2 | 1 |

FIG.16B

AUTHENTICATION CONDITION LIST

| |
|---|
| AUTHENTICATION TARGET TEMPLATE L/R FLAG : L $\Delta\theta$ : $-90° \leqq \Delta\theta \leqq +90°$ TEMPORARY AUTHENTICATION PRIORITY : 2 |
| AUTHENTICATION TARGET TEMPLATE L/R FLAG : L $\Delta\theta$ : OTHER THAN THE ABOVE TEMPORARY AUTHENTICATION PRIORITY : 0 |
| AUTHENTICATION TARGET TEMPLATE L/R FLAG : R $\Delta\theta$ : $-90° \leqq \Delta\theta \leqq +90°$ TEMPORARY AUTHENTICATION PRIORITY : 3 |
| AUTHENTICATION TARGET TEMPLATE L/R FLAG : R $\Delta\theta$ : OTHER THAN THE ABOVE TEMPORARY AUTHENTICATION PRIORITY : 1 |

PASSAGE AUTHORIZATION SYSTEM

CROSS-REFERENCE TO RELATED APPLICATIONS

This application is based upon and claims the benefit of priority of the prior Japanese Patent Application No. 2009-74347, filed on Mar. 25, 2009, the entire contents of which are incorporated herein by reference.

BACKGROUND

Japanese Unexamined Patent Application Publication Nos. 2006-277428 and 2007-77708 disclose biometric authentication techniques using both hands.

FIG. 1 is a diagram describing the technique disclosed in Japanese Unexamined Patent Application Publication No. 2006-277428. Referring to FIG. 1, a biometric authentication apparatus 103 is disposed on the right side of a display panel 102 in an automatic transaction apparatus 101 that is, for example, an ATM at a bank. In this case, it is easy for a user 104 to operate the biometric authentication apparatus 103 with the right hand, but it is difficult for the user 104 to operate it with the left hand. Accordingly, the biometric authentication apparatus 103 is rotatable so as to allow the user 104 to easily operate the biometric authentication apparatus 103 with fingers of the left hand. However, even if the biometric authentication apparatus 103 is rotatable, the user 104 is required to stretch the left hand and the usability of the biometric authentication apparatus 103 is reduced as compared with a case in which the user 104 operates the biometric authentication apparatus 103 with the right hand. Furthermore, since the biometric authentication apparatus 103 requires a dedicated rotation mechanism, it needs maintenance and a higher cost.

FIG. 2 is a diagram describing the technique disclosed in Japanese Unexamined Patent Application Publication No. 2007-77708. Referring to FIG. 2, a passage control apparatus 203 is shared between two rooms 201 and 202. If a fingerprint of the left hand of a user is authenticated, an electric lock control unit 204 allows the user to enter the room 201 on the left side. If a fingerprint of the right hand of the user is authenticated, an electric lock control unit 205 allows the user to enter the room 202 on the right side. Thus, a cost required in a case where the entrance of a user into a plurality of control areas is controlled is reduced and a space utilization efficiency is improved.

The passage control apparatus 203 associates a fingerprint reading surface with a control area, but does not enhance the convenience for right-handed people and left-handed people. For example, in order to enter a control area, a user needs to use a predetermined reading surface associated with the control area and cannot use a desired reading surface. As a result, the user is forced to use a non-dominant hand. This reduces convenience for the user. Furthermore, since the orientation of the user is changed as a result of the reduction in convenience, authentication accuracy is degraded and an authentication speed is reduced.

SUMMARY

A passage authorization system includes a plurality of gate management apparatuses that are individually provided with authentication sensors for acquiring biometric data from a presented hand and form paths, an authentication unit configured to output a result of authentication comparison performed with the biometric data acquired by each of the authentication sensors and a hand determination result of determining whether the biometric data is data of a left hand or a right hand, and a control unit configured to control opening/closing of a gate corresponding to the hand determination result on the basis of the result of authentication comparison.

The object and advantages of the various embodiments will be realized and attained by means of the elements and combinations particularly pointed out in the claims.

It is to be understood that both the foregoing general description and the following detailed description are exemplary and explanatory and are not restrictive of the various embodiments, as claimed.

BRIEF DESCRIPTION OF THE DRAWINGS

FIG. 6 is a diagram illustrating an example of registered biometric data;

FIGS. 7A to 7D are diagrams illustrating examples of a gate control table in the case of a one-way path;

FIGS. 9A to 9D are diagrams illustrating examples of a gate control table in the case of a bi-directional path;

FIGS. 14A and 14B are diagrams illustrating examples of a gate control table and an authentication condition list in a case where authentication targets are limited;

FIGS. 15A and 15B are diagrams illustrating examples of a gate control table and an authentication condition list in a case where an authentication priority is assigned to an authentication target; and FIGS. 16A and 16B are diagrams illustrating examples of a gate control table and an authentication condition list in a case where a temporary authentication priority is assigned to an authentication target.

DESCRIPTION OF EMBODIMENTS

Embodiments of the present invention will be described below.

[Configuration]

Figure 1:
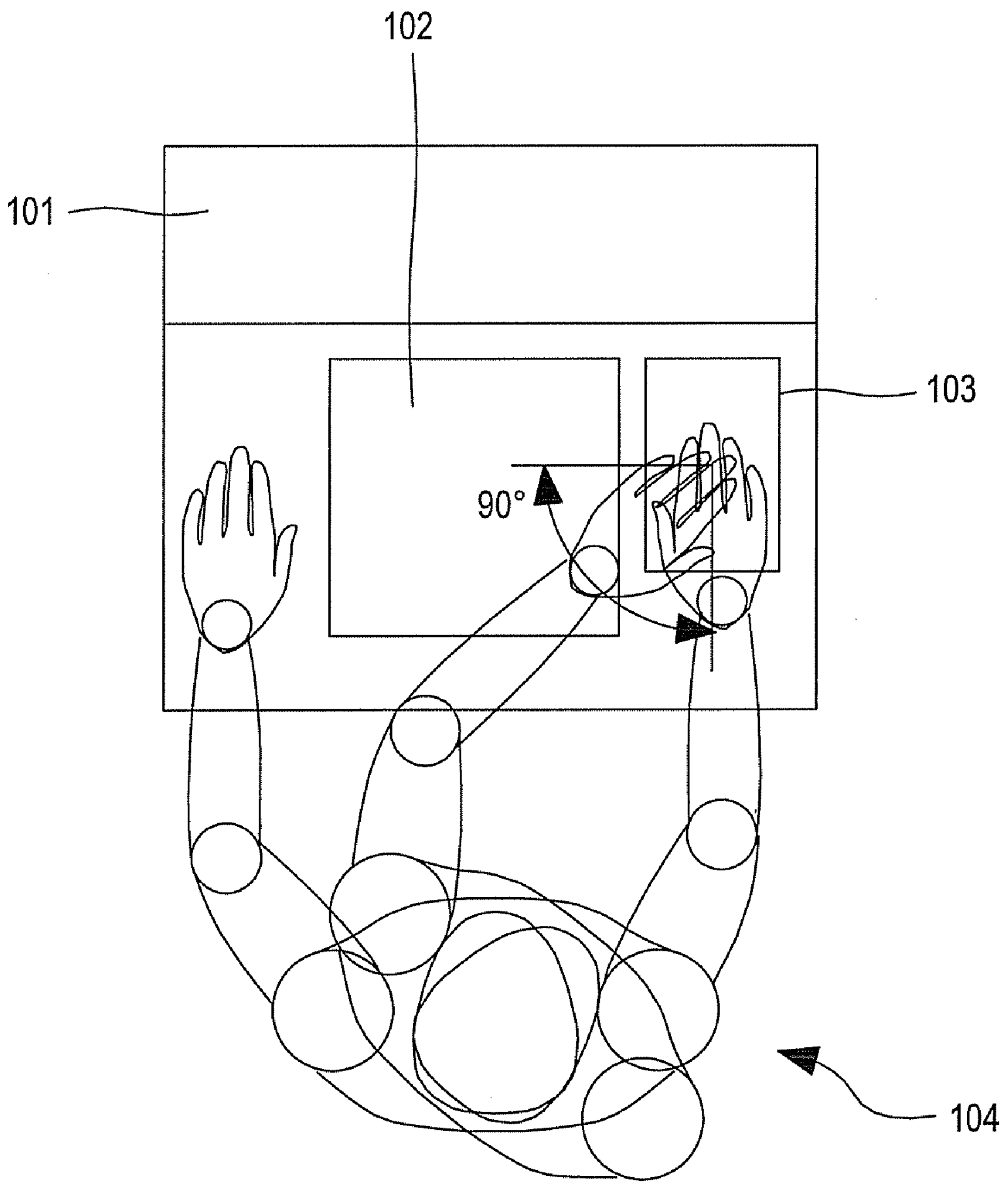
FIG. 1 is a diagram describing a technique disclosed in Japanese Unexamined Patent Application Publication No. 2006-277428.
Figure 2:
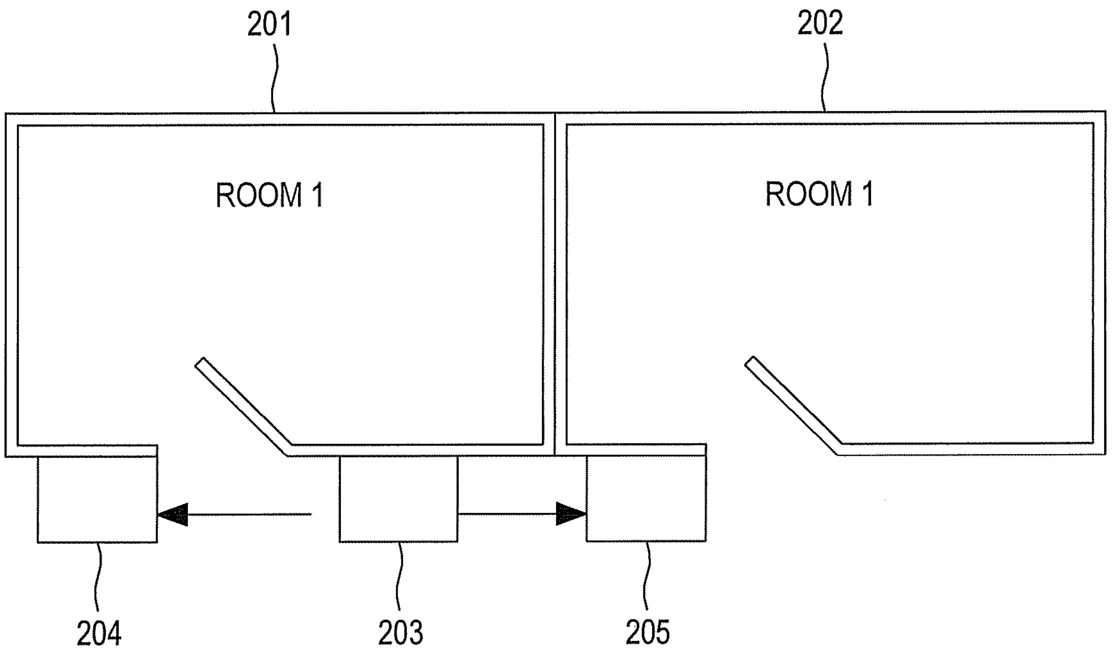
FIG. 2 is a diagram describing a technique disclosed in Japanese Unexamined Patent Application Publication No. 2007-77708.
Figure 3:
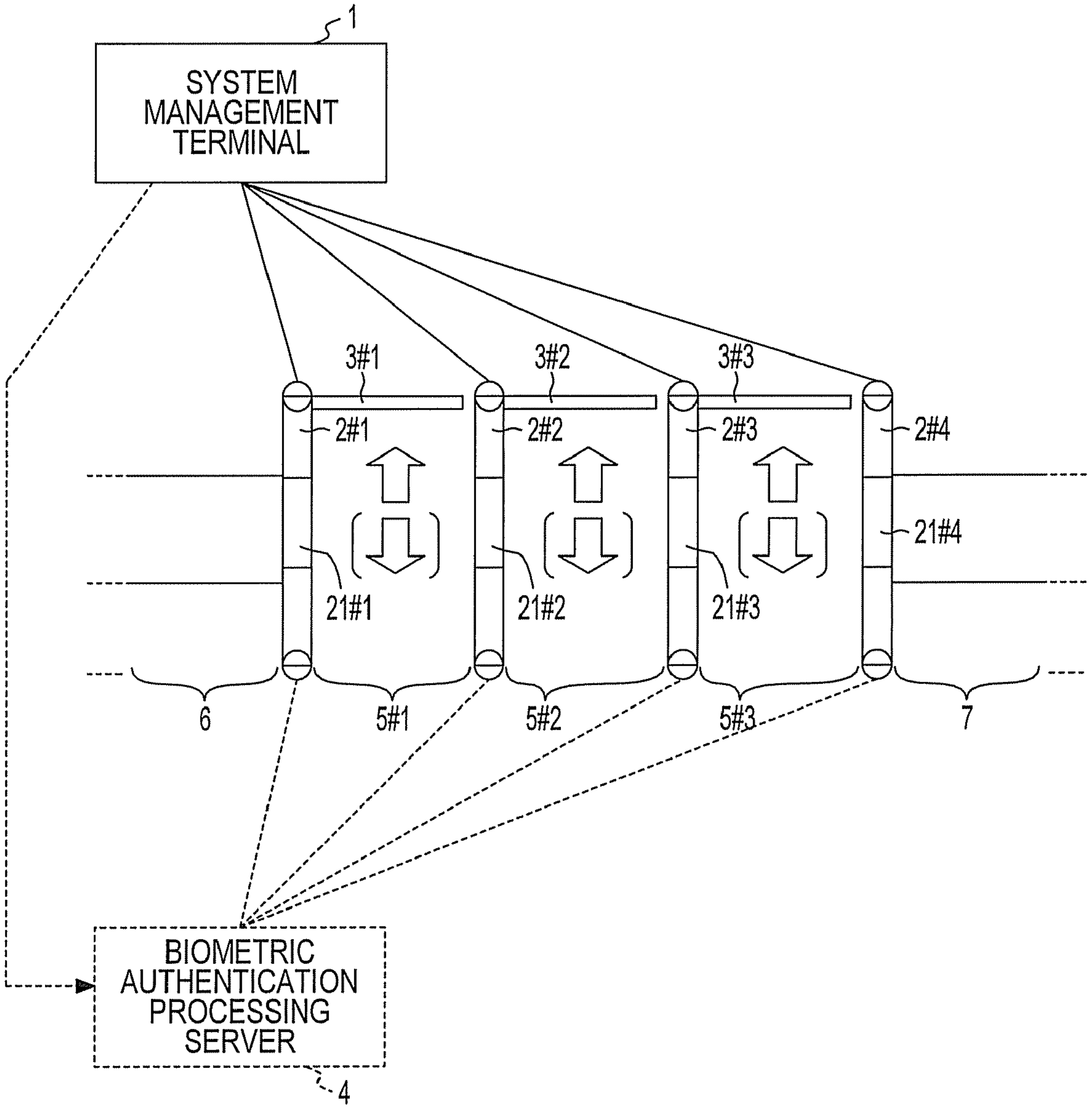
FIG. 3 is a diagram illustrating an exemplary configuration of a biometric authentication gate system according to an embodiment present invention.

FIG. 3 is a diagram illustrating an exemplary configuration of a biometric authentication gate system (passage authorization system) according to an embodiment.

Referring to FIG. 3, the biometric authentication gate system includes a system management terminal 1, a plurality of gate management apparatuses 2#1 to 2#4, a plurality of gates 3#1 to 3#3, and a biometric authentication processing server 4. The biometric authentication processing server 4 is used when integrated authentication processing is performed and is not used when distributed authentication processing is performed by the gate management apparatuses 2#1 to 2#4.

The system management terminal 1 for performing overall management of the biometric authentication gate system is electrically connected to the biometric authentication processing server 4 and the gate management apparatuses 2#1 to 2#4, and performs the registration and deletion of biometric data, the setting of a gate control table, the opening and closing of a gate, etc.

Each of the gate management apparatuses 2#1 to 2#4 acquires the biometric data of a user who wants to pass through a gate and opens/closes the gate in accordance with a result of authentication. The result of authentication includes an authentication comparison result indicating that the user has been determined to be a registrant by comparison, a direction determination result indicating whether the biometric data checked by comparison is left-hand data or right-hand data, and a presentation direction determination result (angle information) for the biometric data checked by comparison which indicates the direction of a presented hand.

The gate management apparatuses 2#1 to 2#4 are provided with authentication sensors 21#1 to 21#4 for acquiring the biometric data of a hand presented by a user, respectively. The gate management apparatuses 2#1 to 2#4 are disposed at predetermined intervals between impassable areas 6 and 7 that are, for example, walls or fences, and form a plurality of paths 5#1 to 5#3. FIG. 3 illustrates the biometric authentication gate system as viewed from above the paths. As an authentication path direction in which authentication is performed, one direction from the bottom to the top of the drawing or two directions one of which is from the bottom to the top of the drawing and the other one of which is from the top to the bottom of the drawing are set. In a case where only entrance into a specific facility is managed, a single authentication path direction is set. In this case, free passage in a direction opposite to the authentication path direction is ensured. In a case where entrance into a specific facility and exit from the facility are required to be managed, it is necessary to set two authentication path directions. For example, in a case where biometric authentication is applied at a station ticket gate, it is necessary to manage entrance and exit for charging. It is possible to perform an effective system operation by achieving a gate capable of setting two authentication path directions since the gate can freely switching among an entrance-only configuration, an exit-only configuration, and a dual-purpose configuration.

The gate management apparatuses 2#1 to 2#3 are provided with the gates 3#1 to 3#3, respectively, and the gate management apparatus 2#4 has no gate. Although a case in which a biometric authentication gate system having four gate management apparatuses and three paths has been described, it is possible to increase or reduce the number of paths by increasing or reducing the number of gate management apparatuses. The number of gate management apparatuses is a value obtained by adding one to the number of paths.

The biometric authentication processing server 4 performs integrated authentication processing by comparing biometric data obtained from a user by each of the gate management apparatuses 2#1 to 2#4 with a biometric data template registered in advance, and is electrically connected to the system management terminal 1 and the gate management apparatuses 2#1 to 2#4.

Figure 4:
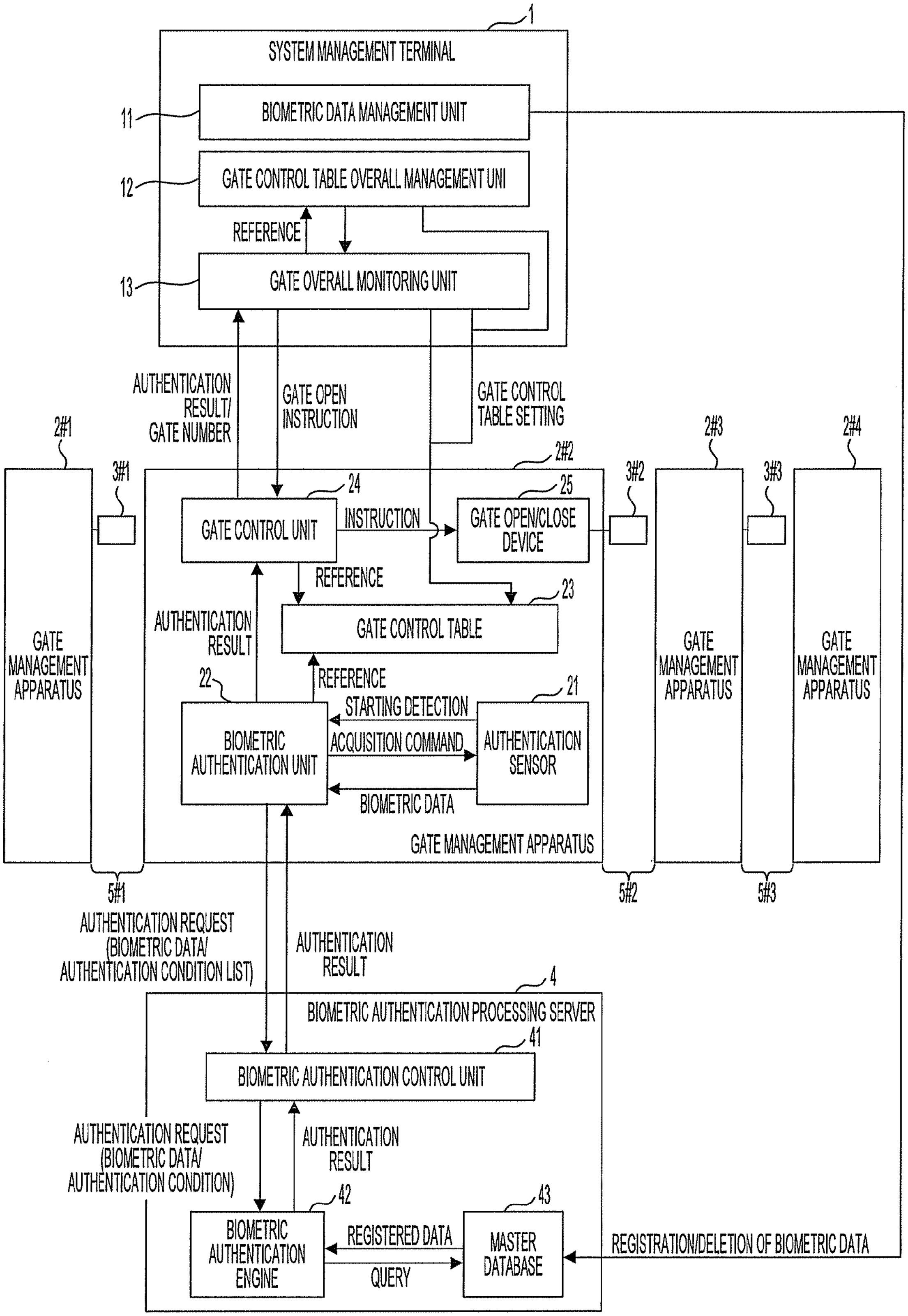
FIG. 4 is a diagram illustrating an exemplary configuration of a biometric authentication gate system used when integrated authentication processing is performed.

FIG. 4 is a diagram illustrating an exemplary configuration of a biometric authentication gate system used when integrated authentication processing is performed. This biometric authentication gate system is suitable for a relatively small-scale operation.

Referring to FIG. 4, the system management terminal 1 includes a biometric data management unit 11, a gate control table overall management unit 12, and a gate overall monitoring unit 13.

The biometric data management unit 11 for managing the biometric data of a user registers biometric data in a master database 43 (to be described later) included in the biometric authentication processing server 4. The biometric data includes a template representing a biometric characteristic of a user.

The gate control table overall management unit 12 for managing a gate control table 23 (to be described later) of each of the gate management apparatuses 2#1 to 2#4 sets the gate control table 23 for each of the gate management apparatuses 2#1 to 2#4 at the time of starting of a system. Furthermore, the gate control table overall management unit 12 notifies the gate overall monitoring unit 13 of contents of the gate control table 23 in response to a reference made by the gate overall monitoring unit 13.

The gate overall monitoring unit 13 monitors the operation states of all of the gate management apparatuses 2#1 to 2#4, and transmits to a corresponding gate management apparatus an instruction for opening a gate (a gate open instruction) as necessary. The gate overall monitoring unit 13 receives from each of the gate management apparatuses 2#1 to 2#4 an authentication result and the number of a gate to be opened. If the gate to be opened is a gate managed by another gate management apparatus different from a gate management apparatus that has transmitted the number of the gate to be opened to the gate overall monitoring unit 13, the gate overall monitoring unit 13 transmits a gate open instruction to a corresponding gate management apparatus. In a case where the gate overall monitoring unit 13 dynamically assigns a temporary authentication priority or the like, the gate overall monitoring unit 13 refers to the contents of the gate control tables via the gate control table overall management unit 12 and performs setting processing for the gate control table 23 of a corresponding gate management apparatus.

Each of the gate management apparatuses 2#1 to 2#4 includes an authentication sensor 21, a biometric authentication unit 22, the gate control table 23, a gate control unit 24, and a gate open/close device 25.

The authentication sensor 21 reads a biometric characteristic used for biometric authentication. More specifically, the authentication sensor 21 is a sensor for reading a fingerprint, the vein of a palm, or the shape of a palm. The authentication sensor 21 includes a distance sensor, a touch sensor, or the like for detecting that a user's hand has been presented so as to determine a reading operation start time.

The biometric authentication unit 22 mediates biometric authentication performed by the biometric authentication processing server 4. That is, the biometric authentication unit 22 receives biometric data from the authentication sensor 21 and transmits an authentication request to the biometric authentication processing server 4. At that time, the biometric authentication unit 22 refers to the gate control table 23 and transmits to the biometric authentication processing server 4 an authentication condition list including a plurality of authentication conditions for performing biometric authentication along with the biometric data. The authentication conditions include information about which of the template of a left hand or the template of a right hand is used for authentication, an authentication priority to be described later, and a temporary authentication priority to be described later. In a case where the left hand and the right hand are equally authenticated, an authentication condition list including an authentication condition “authentication target template L/R flag: L” and an authentication condition “authentication target template L/R flag: R” is transmitted. Alternatively, in a case where the left hand and the right hand are equally authenticated, an authentication condition list may not be added. The biometric authentication unit 22 transmits an authentication result received from the biometric authentication processing server 4 to the gate control unit 24. The authentication result includes the L/R flag value (“L” or “R”) of a template on the condition that biometric data acquired from a user matches any one of registered templates (the degree of similarity obtained by comparison between the biometric data acquired from a user and any one of registered templates exceeds a predetermined value). In the case of a bi-directional path, the authentication result further includes a comparison angle $\Delta\theta$ (a relative rotation angle of an image obtained when the biometric data matches any one of the registered templates).

The gate control table 23 has a data structure describing the relationship between an authentication result and a gate to be opened. Since the gate management apparatuses 2#1 to 2#4 form the paths 5#1 to 5#3, positions at which a user can present are classified into several patterns. Furthermore, since a user presents the right hand or the left hand, it is possible to estimate the position of the user on the basis of an authentication result. As a result, it is possible to appropriately control opening/closing of a gate. A concrete example of the gate control table 23 will be described later.

The gate control unit 24 controls opening of a gate 3 (the gates 3#1 to 3#3) using the gate open/close device 25 on the basis of an authentication result. The gate control unit 24 refers to the gate control table 23 on the basis of an authentication result, specifies a gate to be opened, and autonomously opens the specified gate when the specified gate is its own gate. The gate control unit 24 transmits the authentication result and the gate number of the gate to be opened to the gate overall monitoring unit 13 included in the system management terminal 1. Upon receiving a gate open instruction from the gate overall monitoring unit 13, the gate control unit 24 opens its own gate.

The gate open/close device 25 physically opens/closes the gate 3 that is its own gate (the gates 3#1 to 3#3) in accordance with an instruction transmitted from the gate control unit 24. Since the gate management apparatus 2#4 has no gate, it does not require the gate open/close device 25.

The biometric authentication processing server 4 includes a biometric authentication control unit 41, a biometric authentication engine 42, and the master database 43.

The biometric authentication control unit 41 processes an authentication request transmitted from each of the gate management apparatuses 2#1 to 2#4. Upon receiving biometric data to be authenticated and an authentication condition list from the biometric authentication unit 22 included in the gate management apparatus 2, the biometric authentication control unit 41 transmits the biometric data and the authentication condition list to the biometric authentication engine 42. Upon receiving an authentication result from the biometric authentication engine 42, the biometric authentication control unit 41 transmits it to the biometric authentication unit 22 included in the gate management apparatus 2.

The biometric authentication engine 42 performs authentication by comparing biometric data with a registered template. That is, upon receiving biometric data from the biometric authentication control unit 41 and receiving an authentication condition list as appropriate from the biometric authentication control unit 41, the biometric authentication engine 42 refers to the master database 43 and calculates the degrees of similarity by comparing the received biometric data with all of registered templates. If the maximum value of the degree of similarity exceeds a predetermined threshold value, the biometric authentication engine 42 outputs a user ID corresponding to a registered template having the maximum value of the degree of similarity and the L/R flag of the registered template. In addition, the biometric authentication engine 42 outputs the comparison angle $\Delta\theta$ as necessary. The biometric authentication engine 42 may output an authentication result at the time of obtaining the degree of similarity exceeding a predetermined threshold value without completing the comparison of the biometric data with all registered templates.

The master database 43 stores the biometric data of a user. An example of biometric data will be described later.

Figure 5:
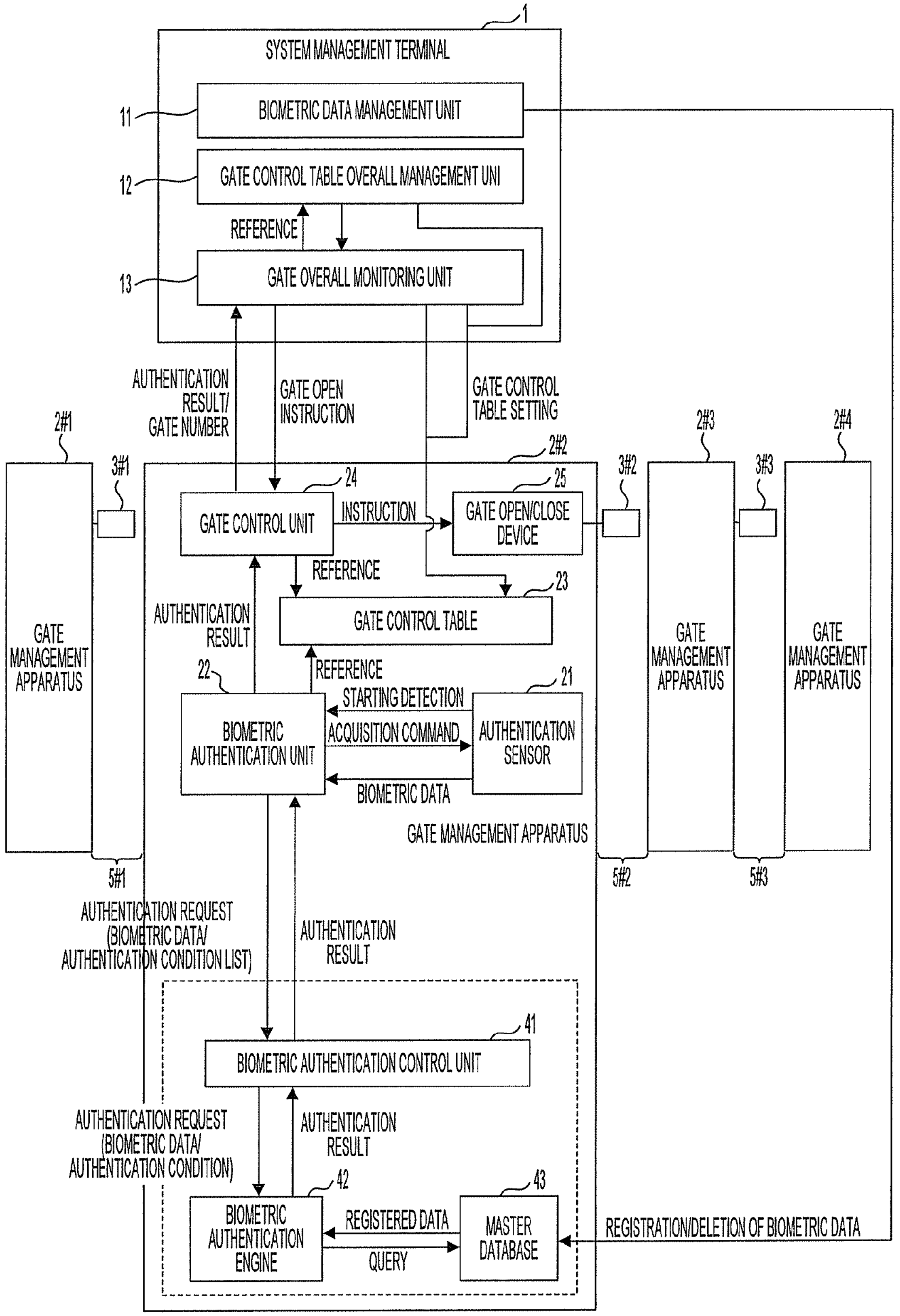
FIG. 5 is a diagram illustrating an exemplary configuration of a biometric authentication gate system used when distributed authentication processing is performed.

FIG. 5 is a diagram illustrating an exemplary configuration of a biometric authentication gate system used when distributed authentication processing is performed. This biometric authentication gate system is suitable for a relatively large-scale operation. Referring to FIG. 5, a biometric authentication control unit 26, a biometric authentication engine 27, and a local memory 28, which correspond to the biometric authentication control unit 41, the biometric authentication engine 42, and the master database 43 included in the biometric authentication processing server 4 illustrated in FIG. 4, respectively, are included in the gate management apparatus 2 (the gate management apparatuses 2#1 to 2#4). Since the biometric authentication engine 27 performs authentication processing using the local memory 28 upon only biometric data acquired by its own gate management apparatus, it can rapidly perform the authentication processing.

FIG. 6 is a diagram illustrating an example of registered biometric data stored in the master database 43 included in the biometric authentication processing server 4 (see, FIG. 4) or the local memory 28 included in the gate management apparatus 2 (the gate management apparatuses 2#1 to 2#4) (see, FIG. 5).

Registered biometric data includes items of “user ID”, “L/R flag”, and “registered template”. The user ID is a unique identification mark assigned to each registered user. The L/R flag is a flag indicating whether a corresponding registered template is a template of the left hand or a template of the right hand. The registered template is biometric characteristic data itself used for comparison processing performed at the time of biometric authentication, and is, for example, fingerprint characteristic data extracted from a fingerprint.

FIGS. 7A to 7D are diagrams illustrating examples of the gate control table 23 in the case of a one-way path. More specifically, FIGS. 7A to 7D illustrate examples of the gate control tables 23 of the gate management apparatuses 2#1 to 2#4, respectively, in a case where four managements apparatuses, the gate management apparatuses 2#1 to 2#4, form three paths, the paths 5#1 to 5#3 as illustrated in FIG. 3. In the gate control table 23, the value of “template L/R flag” that is an authentication result is associated with “gate to be opened” and they are stored.

Figure 8A:
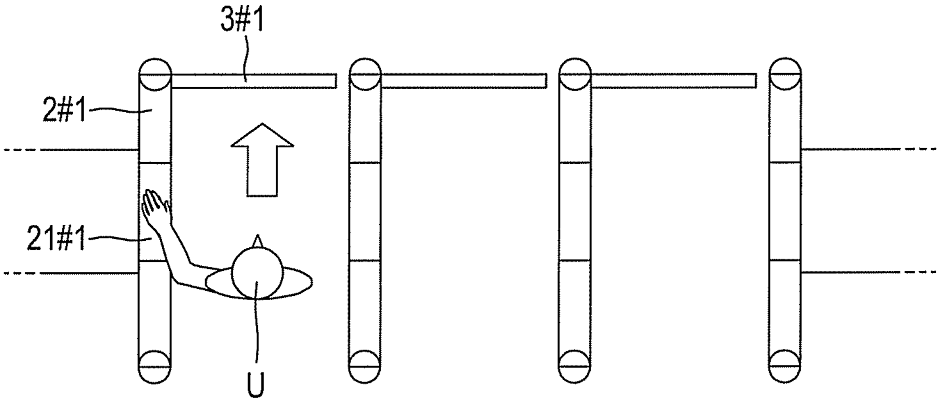
FIGS. 8A to 8D are diagrams illustrating examples of the relationship between the direction of a presented hand and a gate to be opened.
Figure 8B:
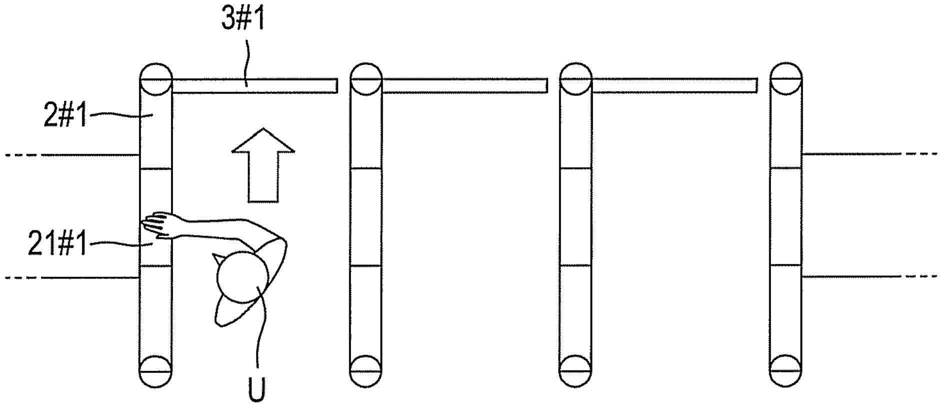

In the gate control table 23 of the gate management apparatus 2#1 illustrated in FIG. 7A, both “L” and “R” in “template L/R flag” which are authentication results are associated with “gate #1” (the gate 3#1) in “gate to be opened”. This means that the "gate to be opened" is the gate 3#1 in both cases where it is determined that the "template L/R flag" is "L" after a user U has presented the left hand to the authentication sensor 21#1 included in the gate management apparatus 2#1 as illustrated in FIG. 8A and where it is determined that the "template L/R flag" is "R" after the user U has unnaturally presented the right hand to the authentication sensor 21#1 included in the gate management apparatus 2#1 as illustrated in FIG. 8B.

Figure 8C:
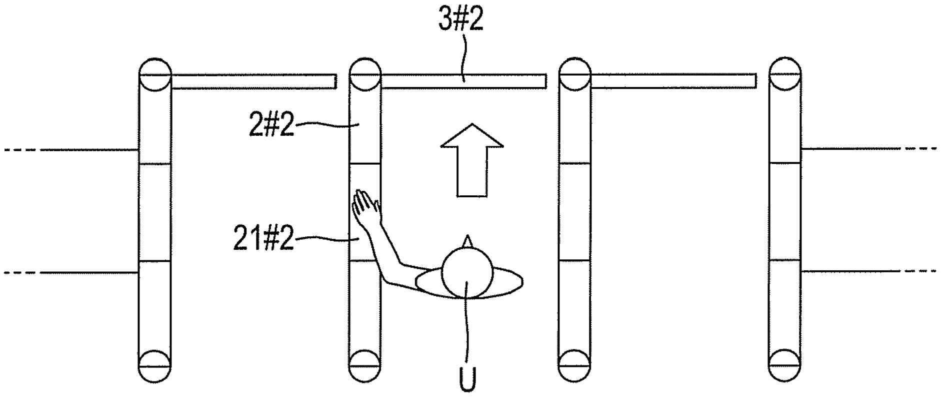
Figure 8D:
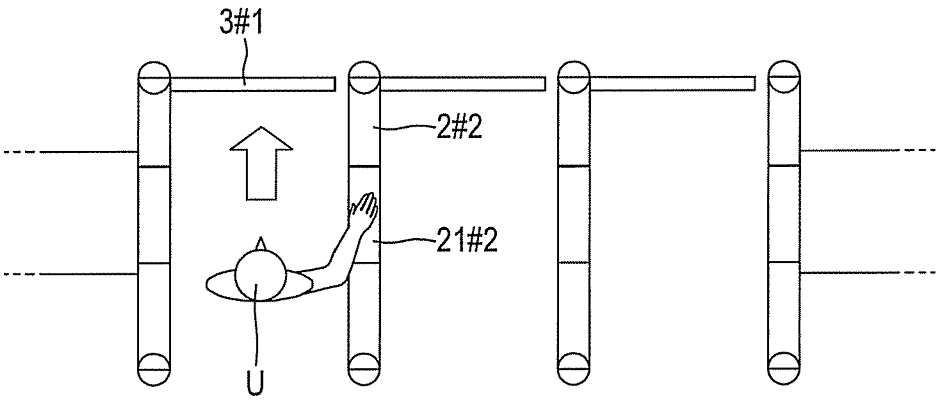

In the gate control table 23 of the gate management apparatus 2#2 illustrated in FIG. 7B, "L" in "template L/R flag" is associated with "gate #2" (the gate 3#2) in "gate to be opened", and "R" in "template L/R flag" is associated with "gate #1" (the gate 3#1) in "gate to be opened". This means that the "gate to be opened" is the gate 3#2 in a case where it is determined that the "template L/R flag" is "L" after the user U has presented the left hand to the authentication sensor 21#2 included in the gate management apparatus 2#2 as illustrated in FIG. 8C and means that the "gate to be opened" is the gate 3#1 in a case where it is determined that the "template L/R flag" is "R" after the user U has presented the right hand to the authentication sensor 21#2 included in the gate management apparatus 2#2 as illustrated in FIG. 8D.

In the gate control table 23 of the gate management apparatus 2#3 illustrated in FIG. 7C, "L" in "template L/R flag" is associated with "gate #3" (the gate 3#3) in "gate to be opened", and "R" in "template L/R flag" is associated with "gate #2" (the gate 3#2) in "gate to be opened". This means a state similar to that described in the case of the gate control table 23 of the gate management apparatus 2#2.

In the gate control table 23 of the gate management apparatus 2#4 illustrated in FIG. 7D, both "L" and "R" in "template L/R flag" are associated with "gate #3" (the gate 3#3) in "gate to be opened". This means a state similar to that described in the case of the gate control table 23 of the gate management apparatus 2#1.

FIGS. 9A to 9D are diagrams illustrating examples of the gate control table 23 in the case of a bi-directional path. More specifically, FIGS. 9A to 9D illustrate examples of the gate control tables 23 of the gate management apparatuses 2#1 to 2#4, respectively, in a case where four gate management apparatuses, the gate management apparatuses 2#1 to 2#4, form three paths, the paths 5#1 to 5#3 as illustrated in FIG. 3. In the gate control table 23, the value of "template L/R flag" and the value of "comparison angle Δθ" which are included in an authentication result are associated with "gate to be opened" and they are stored.

Figure 10A:
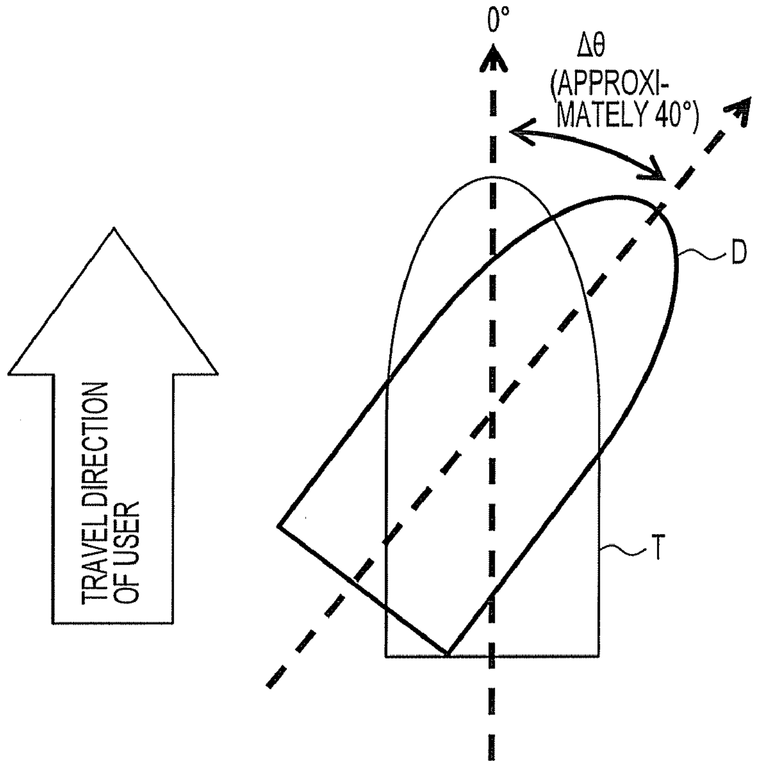
FIGS. 10A and 10B are diagrams illustrating examples of the relationship between a comparison angle $\Delta\theta$ and the travel direction of a user.
Figure 10B:
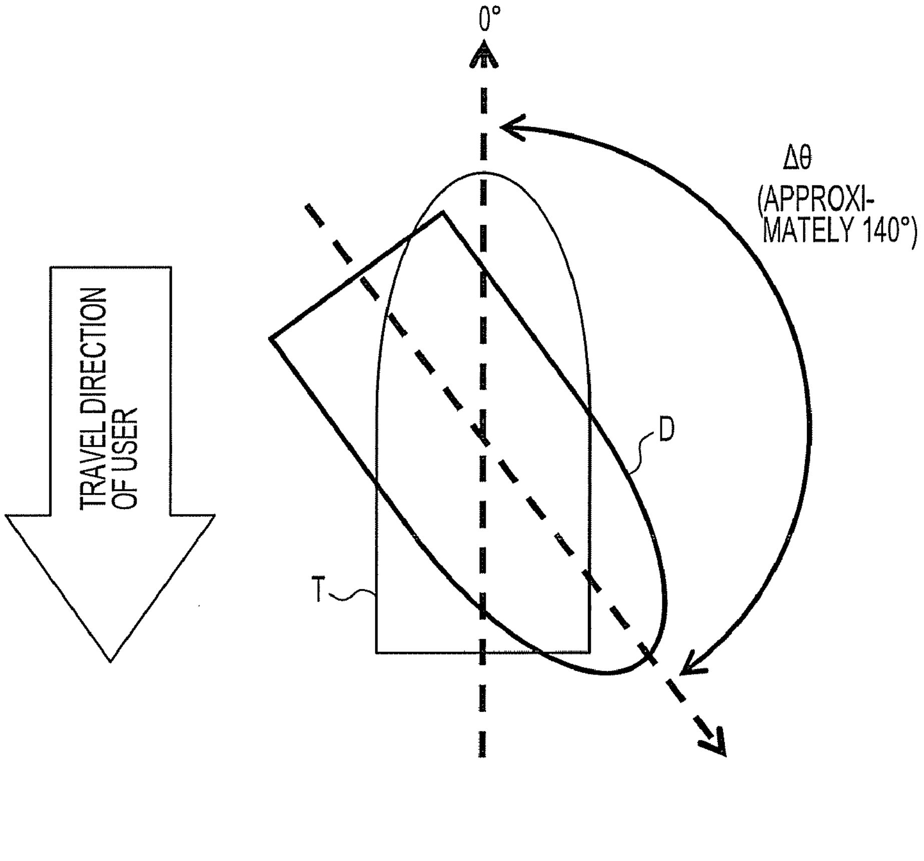

FIGS. 10A and 10B are diagrams illustrating examples of the relationship between the comparison angle Δθ and the travel direction of a user in a case where a fingerprint is used as a biometric characteristic.

FIG. 10A illustrates a case in which a user upwardly travels. Comparison data D acquired from the user matches a registered template T when the registered template T is rotated at approximately 40° of the comparison angle Δθ. In consideration of both the right hand and the left hand, it can be determined that the travel direction is an upward direction in a case where the comparison angle Δθ falls within the range of −90° to +90°.

FIG. 10B illustrates a case in which a user travels downwardly. The comparison data D acquired from the user matches the registered template T when the registered template T is rotated at approximately 140° of the comparison angle Δθ. In consideration of both the right hand and the left hand, it can be determined that the travel direction is a downward direction in a case where the comparison angle Δθ does not fall within the range of −90° to +90°.

Referring back to FIGS. 9A to 9D, in the gate control table 23 of the gate management apparatus 2#1 illustrated in FIG. 9A, "gate #1" (the gate 3#1) is set in "gate to be opened" regardless of whether "L" or "R" included in an authentication result is set in "template L/R flag" and regardless of the comparison angle Δθ included in the authentication result. This means that only the gate 3#1 can be selected in "gate to be opened" regardless of a represented hand (the right hand or the left hand) and a travel direction of a user in a case where the authentication sensor 21#1 included in the gate management apparatus 2#1 performs authentication processing.

Figure 11A:
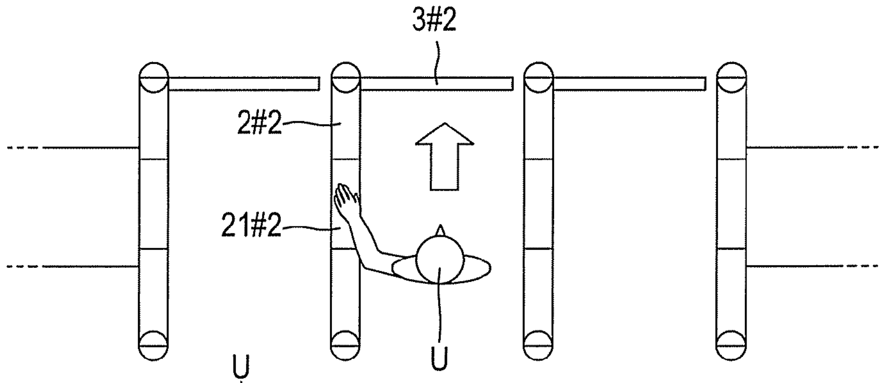
FIGS. 11A to 11D are diagrams illustrating examples of the relationship between the direction of a presented hand and a gate to be opened.
Figure 11B:
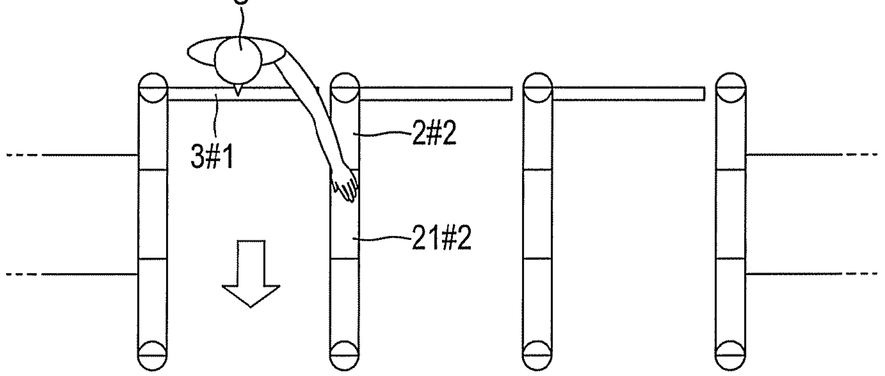

In the gate control table 23 of the gate management apparatus 2#2 illustrated in FIG. 9B, "gate #2" (the gate 3#2) is set in "gate to be opened" in a case where "L" is set in "template L/R flag" and "−90°≦Δθ≦+90°" is set in "comparison angle Δθ", and "gate #1" (the gate 3#1) is set in "gate to be opened" in a case where "L" is set in "template L/R flag" and "other than the above" is set in "comparison angle Δθ". This means that the gate 3#2 is set in "gate to be opened" in a case where it is determined that the "template L/R flag" is "L" and the "comparison angle Δθ" is "−90°≦Δθ≦+90°" as illustrated in FIG. 11A, and means that the gate 3#1 is set in "gate to be opened" in a case where it is determined that the "template L/R flag" is "L" and the "comparison angle Δθ" is "other than the above" as illustrated in FIG. 11B.

Figure 11C:
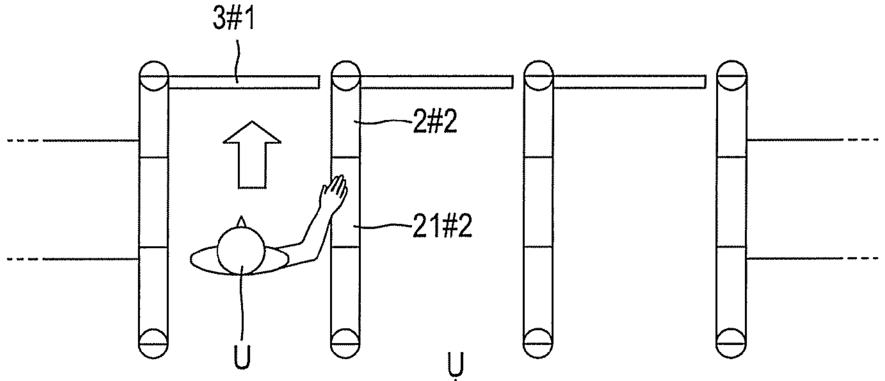
Figure 11D:
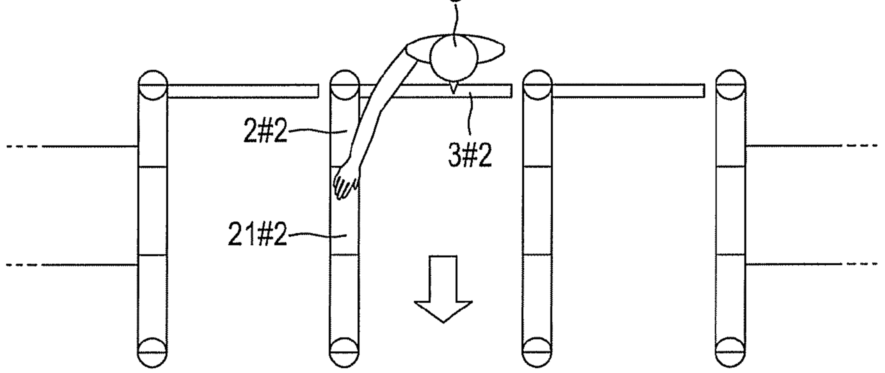

Furthermore, in the gate control table 23 of the gate management apparatus 2#2 illustrated in FIG. 9B, "gate #1" (the gate 3#1) is set in "gate to be opened" in a case where "R" is set in "template L/R flag" and "−90°≦Δθ≦+90°" is set in "comparison angle Δθ", and "gate #2" (the gate 3#2) is set in "gate to be opened" in a case where "R" is set in "template L/R flag" and "other than the above" is set in "comparison angle Δθ". This means that the gate 3#1 is set in "gate to be opened" in a case where it is determined that the "template L/R flag" is "R" and the "comparison angle Δθ" is "−90°≦Δθ≦+90°" as illustrated in FIG. 11C, and means that the gate 3#2 is set in "gate to be opened" in a case where it is determined that the "template L/R flag" is "R" and the "comparison angle Δθ" is "other than the above" as illustrated in FIG. 11D.

In the gate control table 23 of the gate management apparatus 2#3 illustrated in FIG. 9C, "gate #3" (the gate 3#3) is set in "gate to be opened" in a case where "L" is set in "template L/R flag" and "−90°≦Δθ≦+90°" is set in "comparison angle Δθ", and "gate #2" (the gate 3#2) is set in "gate to be opened" in a case where "L" is set in "template L/R flag" and "other than the above" is set in "comparison angle Δθ". Furthermore, "gate #2" (the gate 3#2) is set in "gate to be opened" in a case where "R" is set in "template L/R flag" and "−90°≦Δθ≦+90°" is set in "comparison angle Δθ", and "gate #3" (the gate 3#3) is set in "gate to be opened" in a case where "R" is set in "template L/R flag" and "other than the above" is set in "comparison angle Δθ". This means a state similar to that described in the case of the gate control table 23 of the gate management apparatus 2#2.

In the gate control table 23 of the gate management apparatus 2#4 illustrated in FIG. 9D, "gate #3" (the gate 3#3) is set in "gate to be opened" regardless of whether "L" or "R" included in an authentication result is set in "template L/R flag" and regardless of the comparison angle Δθincluded in the authentication result. This means a state similar to that described in the case of the gate control table 23 of the gate management apparatus 2#1.

[Operation]

Figure 12A:
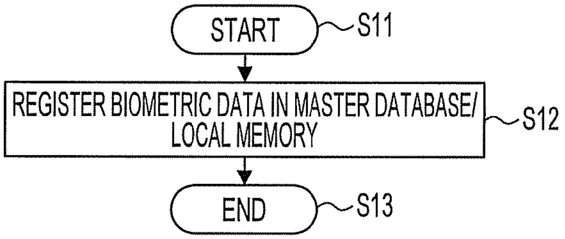
FIGS. 12A to 12C are flowcharts illustrating exemplary processes according to an embodiment.
Figure 12B:
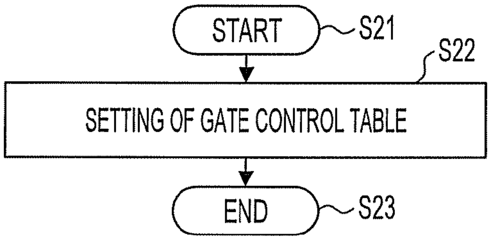
Figure 12C:
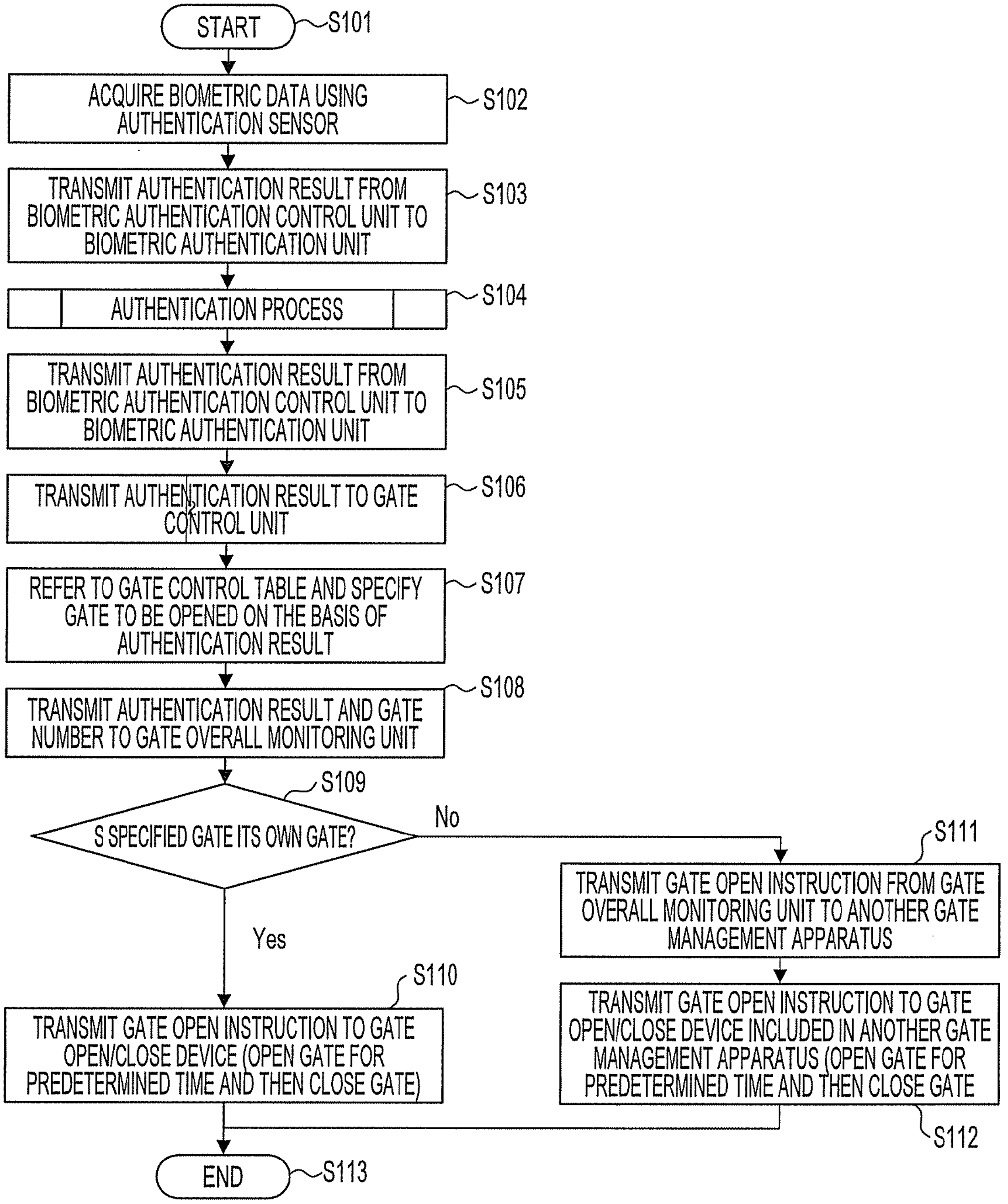

FIGS. 12A to 12C are flowcharts illustrating exemplary processes according to an embodiment of the present invention. FIG. 12A illustrates a biometric data registration process. FIG. 12B illustrates a gate control table setting process. FIG. 12C illustrates a biometric authentication process and a gate control process.

Referring to FIG. 12A, in step S11, a system administrator starts a biometric data registration process at an appropriate time. In step S12, the biometric data management unit 11 included in the system management terminal 1 registers biometric data in the master database 43 included in the biometric authentication processing server 4 (see, FIG. 4) or the local memory 28 included in the gate management apparatus 2 (the gate management apparatuses 2#1 to 2#4) (see, FIG. 5). In step S13, the biometric data registration process ends. The registered biometric data is as illustrated in FIG. 6.

Referring to FIG. 12B, in step S21, a gate control table setting process starts with the starting of a biometric authentication gate system. In step S22, the gate control table overall management unit 12 included in the system management terminal 1 performs setting of contents upon the gate control table 23 included in the gate management apparatus 2 (the gate management apparatuses 2#1 to 2#4). In step S23, the gate control table setting process ends. The set gate control table 23 varies from a gate management apparatus to a gate management apparatus as illustrated in FIGS. 7A to 7D illustrating gate control tables in the case of a one-way path and FIGS. 9A to 9D illustrating gate control tables in the case of a bi-directional path.

Referring to FIG. 12C, in step S101, the gate management apparatus 2 (each of the gate management apparatuses 2#1 to 2#4) starts a process by detecting a hand presented by a user using a distance sensor, a touch sensor, or the like included in the authentication sensor 21. In step S102, the biometric authentication unit 22 acquires biometric data using the authentication sensor 21. That is, the biometric authentication unit 22 detects starting of authentication while communicating with the authentication sensor 21. When detecting a user's hand, the biometric authentication unit 22 instructs the authentication sensor 21 to acquire biometric data and receives biometric data from the authentication sensor 21.

In step S103, the biometric authentication unit 22 transmits an authentication request to the biometric authentication control unit 41 included in the biometric authentication processing server 4 (see, FIG. 4) or the biometric authentication control unit 26 (see, FIG. 5).

In step S104, the biometric authentication control unit 41 (see, FIG. 4) or the biometric authentication control unit 26 (see, FIG. 5) that has received the authentication request performs an authentication process. Details of the authentication process will be described later.

In step S105, the biometric authentication control unit 41 (see, FIG. 4) or the biometric authentication control unit 26 (see, FIG. 5) transmits an authentication result to the biometric authentication unit 22.

In step S106, the biometric authentication unit 22 transmits the received authentication result to the gate control unit 24.

In step S107, the gate control unit 24 that has received the authentication result refers to the gate control table 23 and specifies a gate to be opened on the basis of the authentication result. That is, in the case of a one-way path, the gate control unit 24 refers to one of the gate control tables 23 illustrated in FIGS. 7A to 7D and specifies the "gate to be opened" on the basis of the "template L/R flag" that is the authentication result. In the case of a bi-directional path, the gate control unit 24 refers to one of the gate control tables 23 illustrated in FIGS. 9A to 9D and specifies the "gate to be opened" on the basis of the "template L/R flag" and the "comparison angle Δθ" which are included in the authentication result.

Referring back to FIG. 12C, in step S108, the gate control unit 24 transmits the authentication result and the gate number of the "gate to be opened" that has been specified to the gate overall monitoring unit 13 included in the system management terminal 1.

In step S109, the gate control unit 24 determines whether the "gate to be opened" that has been specified is the gate 3 managed by its own gate management apparatus. If the "gate to be opened" that has been specified is the gate 3 managed by its own gate management apparatus (Yes in step S109), the gate control unit 24 transmits a gate open instruction to the gate open/close device 25 and the gate open/close device 25 opens the gate 3 for a predetermined period and closes the gate 3 using an internal timer in step S110. In step S113, the process ends.

If the "gate to be opened" that has been specified is not the gate 3 managed by its own gate management apparatus (No in step S109), the gate overall monitoring unit 13 included in the system management terminal 1 transmits a gate open instruction to the gate control unit 24 included in the corresponding gate management apparatus 2 in step S111.

The gate control unit 24 included in the gate management apparatus 2 that has received the gate open instruction transmits the gate open instruction to the gate open/close device 25 included in the gate management apparatus 2 and the gate open/close device 25 opens the gate 3 for a predetermined period and closes the gate 3 in step S112. The process ends in step S113.

Figure 13:
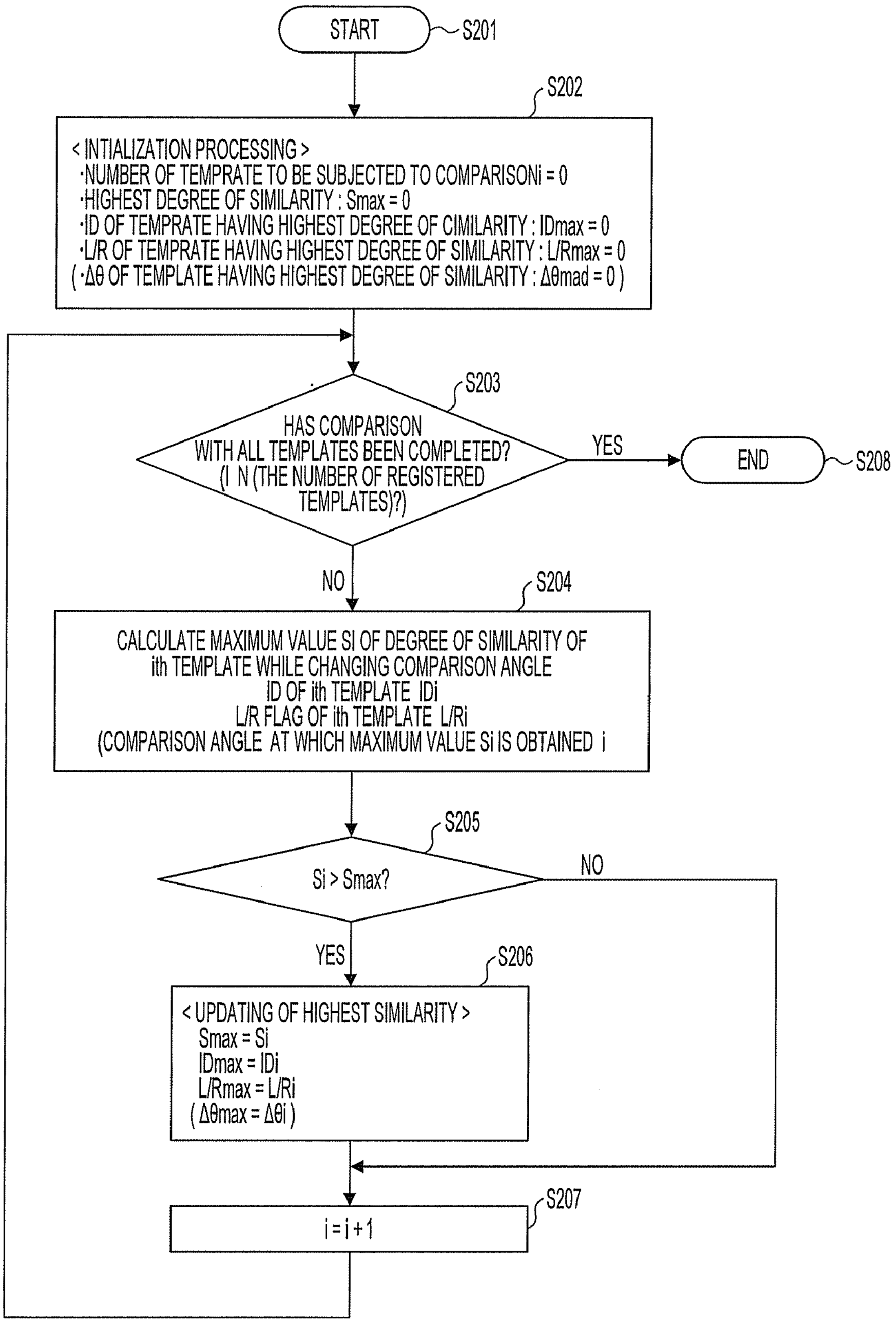
FIG. 13 is a flowchart illustrating an exemplary authentication process.

FIG. 13 is a flowchart illustrating an exemplary authentication process.

Referring to FIG. 13, in step S201, an authentication process starts. In step S202, initialization processing is performed. In the initialization processing, i representing the number of a template to be subjected to comparison processing, Smax representing the highest degree of similarity, IDmax representing the ID of a template having the highest degree of similarity, L/Rmax representing the L/R flag of the template having the highest degree of similarity, and Δθmax representing the comparison angle Δθ of the template having the highest degree of similarity are set to zero. In the case of a one-way path, Δθmax is not required.

In step S203, it is determined whether comparison with all templates has been completed by determining whether i reaches N representing the number of all registered templates. If it is determined that comparison with all templates has been completed (Yes in step S203), the authentication process ends in step S208.

If it is determined that comparison with all templates has yet to be completed (No in step S203), Si representing the maximum value of the degree of similarity of an ith template is calculated while changing the comparison angle Δθ, the ID of the ith template is set to IDi, the L/R flag of the ith template is set to L/Ri, and the comparison angle Δθ at which Si is obtained is set to Δθi in step S204. In the case of a one-way path, Δθi is not required.

In step S205, it is determined whether Si exceeds Smax. If Si exceeds Smax (Yes in step S205), the highest degree of similarity is updated in step S206. That is, Si is set as Smax, IDi is set as IDmax, L/Ri is set as L/Rmax, and Δθi is set as Δθmax. In the case of a one-way path, Δθmax is not required.

In step S207, one is added to i. The authentication process returns to step S203 in which it is determined whether comparison with all templates has been completed.

If Smax that is the highest degree of similarity exceeds a predetermined value after the authentication process has ended in step S208, IDmax, L/Rmax, and Δθmax are used as an authentication result.

[Special Authentication Condition Setting Case]

In a case where the characteristic (usage) of each path is known in advance, it is possible to effectively perform the authentication process using the characteristic. For example, in a case where there are a plurality of paths as illustrated in FIG. 3, under the assumption that these paths are one-way paths from the bottom to the top of the drawing, it is expected that most of hands used at the gate management apparatus 2#1 disposed at the extreme left end as viewed from users will be left hands and many left-handed persons will gather at the gate management apparatus 2#1. Accordingly, by setting the gate management apparatus 2#1 as an apparatus intended for left-hand use and limiting authentication targets to templates of left hands, it is possible to effectively perform the authentication process.

FIGS. 14A and 14B are diagrams illustrating examples of the gate control table 23 and an authentication condition list in a case where authentication targets are limited. The gate management apparatus 2#1 illustrated in FIG. 4 or 5 is set as an apparatus intended for left-hand use and the path 5#1 is used for authentication of only users traveling from the bottom to the top of the drawing.

FIG. 14A illustrates an example of the gate control table 23 of the gate management apparatus 2#1. In the gate control table 23, only "L" is set in "template L/R flag" and "gate #1" (the gate 3#1) is set in "gate to be opened" corresponding to "template L/R flag".

FIG. 14B illustrates an example of an authentication condition list that is transmitted within an authentication request at the time of the authentication process from the biometric authentication unit 22 included in the gate management apparatus 2#1 to the biometric authentication control unit 41 included in the biometric authentication processing server 4 (see, FIG. 4) or the biometric authentication control unit 26 (see, FIG. 5). In the authentication condition list, only an authentication condition "authentication target template L/R flag: L" indicating that only left hands are to be authenticated is set.

In this case, the biometric authentication engine 42 included in the biometric authentication processing server 4 (see, FIG. 4) or the biometric authentication engine 27 (see, FIG. 5) sets only templates having "L" of the "L/R flag" as authentication target templates in accordance with the authentication condition and can skip templates having "R" of the "L/R flag". Accordingly, it is possible to reduce a resource (a processing time or calculation power) required for the authentication process by approximately half.

On the other hand, in a case where a gate management apparatus intended for left-hand use is disposed as described previously, it can be expected that many left-handed persons will gather at a gate management apparatus near the gate management apparatus intended for left-hand use. This is caused by the usage of the gate management apparatus near the gate management apparatus intended for left-hand use by an overflow of the gate management apparatus intended for left-hand use.

In this case, by setting an item "authentication priority" in the gate control table, it is possible to effectively perform the authentication process. The "authentication priority" is a value representing the priority for the authentication process. The higher the value, the higher the priority for the authentication process.

FIGS. 15A and 15B are diagrams illustrating examples of the gate control table 23 of the gate management apparatus 2#2 and an authentication condition list in a case where an authentication priority is assigned to an authentication target.

FIG. 15A illustrates an example of the gate control table 23 of the gate management apparatus 2#2. In the gate control table 23, the item "authentication priority" is added to the items included in the gate control table 23 illustrated in FIG. 7B, "1" is set in "authentication priority" when "L" is set in "template L/R flag", and "0" is set in "authentication priority" when "R" is set in "template L/R flag". Thus, the authentication priority for left hands is increased.

FIG. 15B illustrates an example of an authentication condition list that is transmitted within an authentication request at the time of the authentication process from the biometric authentication unit 22 included in the gate management apparatus 2#2 to the biometric authentication control unit 41 included in the biometric authentication processing server 4 (see, FIG. 4) or the biometric authentication control unit 26 (see, FIG. 5). In the authentication condition list, authentication conditions "authentication target template L/R flag: L, authentication priority: 1" and "authentication target template L/R flag: R, authentication priority: 0" are set.

In this case, first, the biometric authentication control unit 41 included in the biometric authentication processing server 4 (see, FIG. 4) or the biometric authentication control unit 26 (see, FIG. 5) requests the biometric authentication engine 42 or 27 to perform authentication with a template having "L". If authentication succeeds, the authentication process ends and an authentication result is transmitted back to the biometric authentication control unit 41 included in the biometric authentication processing server 4 (see, FIG. 4) or the biometric authentication control unit 26 (see, FIG. 5). On the other hand, if authentication fails, the biometric authentication control unit 41 included in the biometric authentication processing server 4 (see, FIG. 4) or the biometric authentication control unit 26 (see, FIG. 5) requests the biometric authentication engine 42 or 27 to perform authentication with a template having "R". By preferentially performing the authentication process using a template having a high probability of success, it is possible to effectively perform the authentication process.

In a case where a prediction can be made with usage patterns of other gates, it is possible to effectively perform the authentication process by changing an authentication priority in accordance with the usage patterns of these gates. For example, in a case where a biometric authentication system is used at a station ticket gate, it is expected that the number of users will increase in a direction of the exit from the station ticket gate at the time of arrival of a train. Under the assumption that, when the authentication process is performed at a certain gate, the number of users of gates near the gate increases in the same direction, it is possible to effectively perform the authentication process by temporarily setting an authentication priority for these gates. Here, descriptions will be made under the assumption that bi-directional paths are formed.

FIGS. 16A and 16B are diagrams illustrating examples of the gate control table 23 and an authentication condition list in a case where a temporary authentication priority is assigned to an authentication target. When another gate management apparatus detects a user traveling in a direction from the bottom to the top of, for example. FIG. 3, a priority for the direction is increased. The above-described "authentication priority" is fixedly set in accordance with the configuration of a gate, but the "temporary authentication priority" is temporarily set in accordance with the usage pattern of a gate.

FIG. 16A illustrates an example of the gate control table 23 of the gate management apparatus 2#2. In the gate control table 23, an item "temporary authentication priority" is added to the items included in the gate control table 23 illustrated in FIG. 9B, "2" is set in "temporary authentication priority" when "L" is set in "template L/R flag" and "−90°≦Δθ≦+90°" is set in "comparison angle Δθ", "0" is set in "temporary authentication priority" when "L" is set in "template L/R flag" and "other than the above" is set in "comparison angle Δθ", "3" is set in "temporary authentication priority" when "R" is set in "template L/R flag" and "−90°≦Δθ≦+90°" is set in "comparison angle Δθ", and "1" is set in "temporary authentication priority" when "R" is set in "template L/R flag" and "other than the above" is set in "comparison angle Δθ". In this case, the "temporary authentication priority" corresponding to Δθ in the same direction, that is, in the same range, is set to a high value. Furthermore, since it is expected that the number of right-handed persons is generally larger than that of left-handed persons, the higher "temporary authentication priority" is assigned to right hands. Here, there are four levels of the "temporary authentication priority". The gate overall monitoring unit 13 included in the system management terminal 1 sets the "temporary authentication priority" for the gate control table 23 of the gate management apparatus 2#2.

FIG. 16B illustrates an example of an authentication condition list that is transmitted within an authentication request at the time of the authentication process from the biometric authentication unit 22 included in the gate management apparatus 2#2 to the biometric authentication control unit 41 included in the biometric authentication processing server 4 (see, FIG. 4) or the biometric authentication control unit 26 (see, FIG. 5). In the authentication condition list, authentication conditions, "authentication target template L/R flag: L, Δθ: −90°≦Δθ≦+90°, temporary authentication priority: 2", "authentication target template L/R flag: L, Δθ: other than the above, temporary authentication priority: 0", "authentication target template L/R flag: R, Δθ: −90°≦Δθ≦+90°, temporary authentication priority: 3", and "authentication target template L/R flag: R, Δθ: other than the above, temporary authentication priority: 1" are set.

In this case, the biometric authentication control unit 41 included in the biometric authentication processing server 4 (see, FIG. 4) or the biometric authentication control unit 26 (see, FIG. 5) performs the authentication process upon templates in descending order of the temporary authentication priority, and transmits an authentication result to the gate management apparatus 2#2 at the time of success of the authentication process.

The "temporary authentication priority" is effective for only a predetermined time. After the predetermined time has elapsed, a corresponding part is cleared to zero. The gate overall monitoring unit 13 included in the system management terminal 1 may perform the zero clearance upon the gate control table 23 of the gate management apparatus 2#2. Alternatively, time stamping may be performed upon the "temporary authentication priority", and the gate management apparatus 2#2 may autonomously perform the zero clearance.

The gate control table 23 and an authentication condition list may have both the "authentication priority" that is fixedly set and the "temporary authentication priority". In this case, it is possible to effectively perform the authentication process by performing fixed priority processing in accordance with the arrangement of gates and performing temporary priority processing.

Furthermore, a prediction can be made using a tendency for continuous users of the same gate management apparatus to travel in the same direction. That is, when focusing attention on a certain path, it can be assumed that a user's travel direction rarely changes and continuous users often travel in the same direction. This is because that it can be assumed that continuous users pass through the gate one after another.

In this case, in order to effectively perform the authentication process, an authentication priority is temporarily increased in a gate management apparatus. That is, the temporary authentication priority for the authentication process performed on the same condition as that of the last authentication process is increased.

Still furthermore, an authentication priority may be set in accordance with time (setting of an authentication priority performed in accordance with time). For example, in a case where a biometric authentication system is used at a station ticket gate, it is possible to effectively perform the authentication process by increasing a priority for the authentication process performed for a user traveling in a corresponding direction (a direction of exit from the station ticket gate) at an expected arrival time of a train known in advance.

Still furthermore, a hand mainly used by a user may be registered in advance at the time of registration of a biometric authentication template, and an authentication priority may be set on the basis of the registered information (setting of an authentication priority performed on the basis of registered data). In general, the ratio between right-handed persons and left-handed persons is constant. However, the ratio may change in a case where a relatively small number of users are registered. In this case, for example, if the number of registered right-handed users is larger than usual, it is possible to effectively perform the authentication process by setting an authentication priority in accordance with such a state'

[Overview]

As described previously, according to various embodiments, the following advantages can be obtained: (1) the increase in an apparatus installation cost can be prevented because the number of authentication sensors is limited to a number obtained by adding one to the number of paths; and (2) it is possible to enhance the convenience and authentication accuracy of an apparatus because the apparatus can similarly use the left hand and the right hand for authentication and allows a user to use a easier-to-use hand for authentication.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc—Read Only Memory), and a CD-R (Recordable)/RW. An example of communication media includes a carrier-wave signal. The media described above are non-transitory media.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although various embodiments have been described in detail, it should be understood that the various changes, substitutions, and alterations could be made hereto without departing from the spirit and scope of the invention.

What is claimed is:

1. A passage authorization system, comprising:

a plurality of gate management apparatuses that are individually provided with authentication sensors configured to acquire biometric data from a presented hand and to form walkways between the plurality of gate management apparatuses;

an authentication unit configured to output a result of authentication comparison performed with the biometric data acquired by each of the authentication sensors and a hand determination result of determining whether the biometric data is data of a left hand or a right hand; and a control unit configured to control opening and closing of a gate corresponding to the hand determination result based on the result of authentication comparison, wherein the authentication unit outputs a hand presentation direction determination result of determining a direction of the presented hand from which the biometric data is acquired, and wherein the control unit controls opening and closing of a gate corresponding to the hand determination result and the hand presentation direction determination result based on the result of authentication comparison.

2. The passage authorization system according to claim 1, wherein the direction of the presented hand is determined based on a rotation angle of an image corresponding to a registered template at the time of comparison between the biometric data and the registered template.

3. The passage authorization system according to claim 1, further comprising a gate control table describing a relationship between the hand determination result output by the authentication unit and a gate to be opened.

4. The passage authorization system according to claim 1, further comprising a gate control table describing a relationship among the hand determination result output by the authentication unit, the hand presentation direction determination result output by the authentication unit, and a gate to be opened.

5. The passage authorization system according to claim 1, wherein a registered template to be subjected to comparison performed by the authentication unit is limited to a template of a left hand or a right hand based on a characteristic of the walkways.

6. The passage authorization system according to claim 1, wherein a fixed authentication priority is assigned to a registered template to be subjected to comparison performed by the authentication unit based on a characteristic of the walkways.

7. The passage authorization system according to claim 1, wherein a temporary authentication priority is assigned to a registered template to be subjected to comparison performed by the authentication unit based on a characteristic of the walkways.

8. A control method for a passage authorization system including a plurality of gate management apparatuses that are individually provided with authentication sensors for acquiring biometric data from a presented hand and forming walkways between the plurality of gate management apparatuses, the method comprising:

outputting a result of authentication comparison performed with the biometric data acquired by each of the authentication sensors and a hand determination result of determining whether the biometric data is data of a left hand or a right hand;

outputting a hand presentation direction determination result of determining a direction of the presented hand from which the biometric data is acquired; and controlling opening and closing of a gate corresponding to the hand determination result and the hand presentation direction determination result based on the result of authentication comparison.

* * * * *